Figures 1, 2:
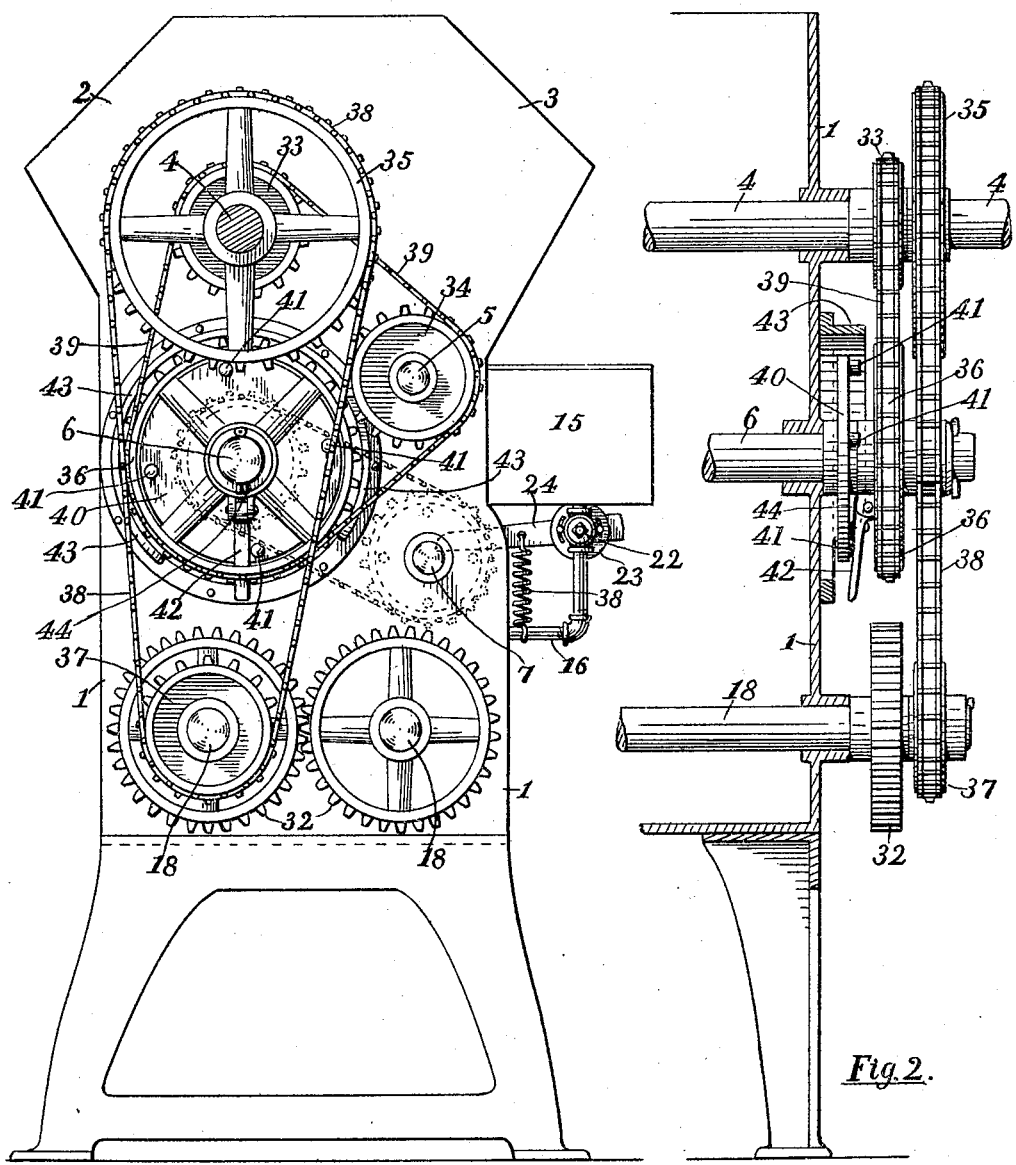

No. 807,207. PATENTED DEC. 12, 1905.
G. D. SCHEIFFLER.
MACHINE FOR MIXING CONCRETE.
APPLICATION FILED MAY 8, 1905.

2 SHEETS—SHEET 1.

Witnesses
Edward R. Monroe
Georgiana Chace

Inventor
George D. Scheiffler
By Luther V. Moulton
Attorney

No. 807,207. PATENTED DEC. 12, 1905.
G. D. SCHEIFFLER.
MACHINE FOR MIXING CONCRETE.
APPLICATION FILED MAY 8, 1905.
2 SHEETS—SHEET 2.
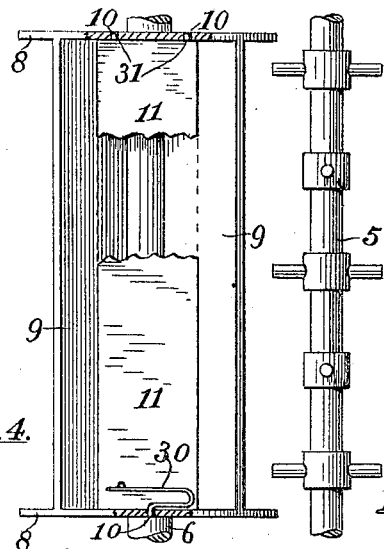
Fig. 4.
Fig. 5.
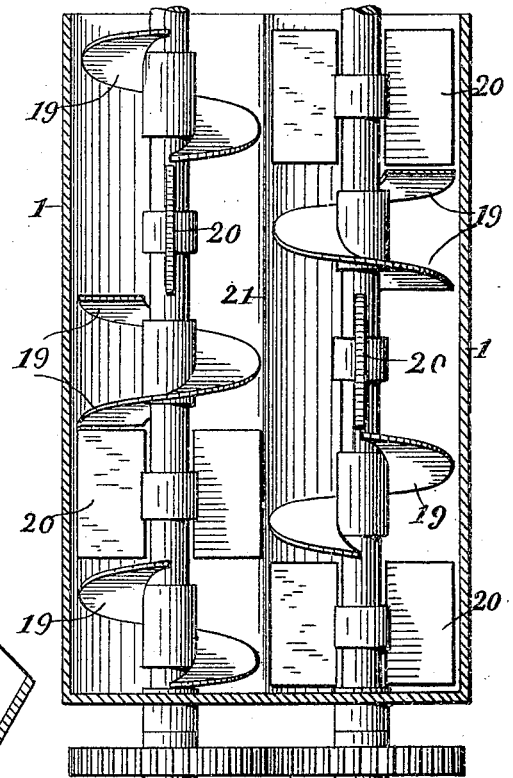
Fig. 6.
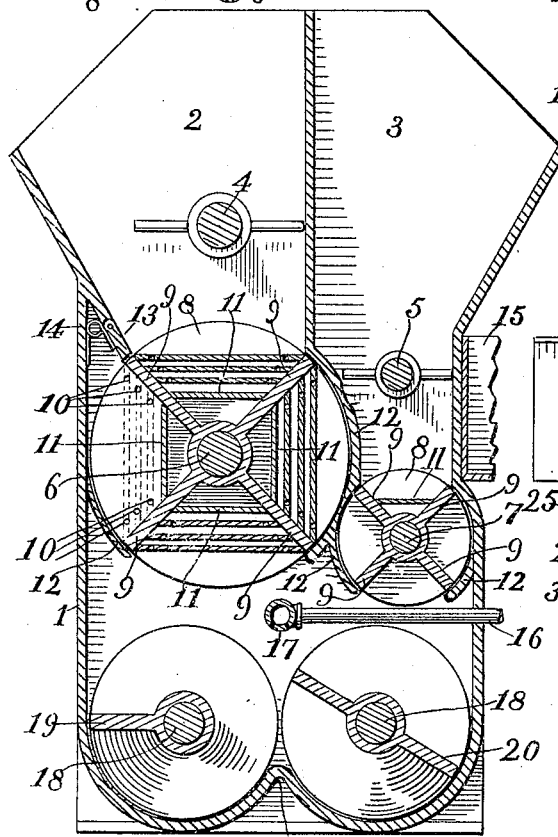
Fig. 3.
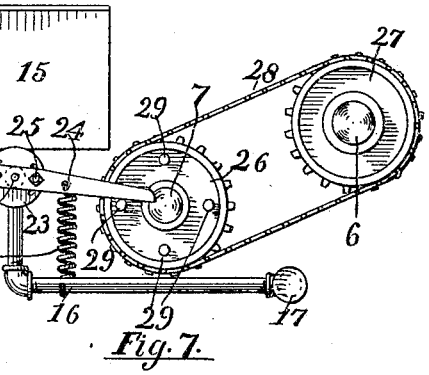
Fig. 7.
Witnesses
Edward R. Monroe.
Georgiana Chace
Inventor
George D. Scheiffler
By Luther V. Moulton
Attorney

UNITED STATES PATENT OFFICE.

GEORGE D. SCHEIFFLER, OF JACKSON, MICHIGAN.

MACHINE FOR MIXING CONCRETE.

No. 807,207.

Specification of Letters Patent.

Patented Dec. 12, 1905.

Application filed May 8, 1905. Serial No. 259,332.

*To all whom it may concern:*

Be it known that I, GEORGE D. SCHEIFFLER, a citizen of the United States, residing at Jackson, in the county of Jackson and State of Michigan, have invented certain new and useful Improvements in Machines for Mixing Concrete; and I do hereby declare the following to be a full, clear, and exact description of the invention, such as will enable others skilled in the art to which it appertains to make and use the same.

My invention relates to improvements in machines for mixing concrete; and its object is to provide a machine that will automatically and accurately apportion the various ingredients and thoroughly mix the same and to provide the device with various new and useful features hereinafter more fully described, and particularly pointed out in the claims.

My device consists, essentially, of receptacles for the sand, cement, and water, chambered cylinders to receive the sand and cement, means for imparting an intermittent rotary motion to the cylinders, and valve to intermittently discharge the water, adjustable means for operating the valve, a mixer comprising alternate arrangement of paddles and screw conveyers, means for operating the said devices, and in various novel features of construction and arrangement, as will more fully appear by reference to the accompanying drawings, in which—

Figure 1 is an end elevation of a device embodying my invention; Fig. 2, a detail of the driving mechanism; Fig. 3, a transverse vertical section through the machine; Fig. 4, a detail in plan view of the sand-measuring cylinder; Fig. 5, a detail of one of the agitators; Fig. 6, a detail in plan view of the mixer; and Fig. 7, a detail of the connecting gearing of the two measuring-cylinders, together with the valve-operating means viewed from the direction opposite to the direction of view in Figs. 1 and 3.

Like numerals refer to like parts in all of the figures.

1 represents the case of the machine, in the upper part of which is a hopper 2 to receive the sand and a hopper 3 to receive the cement. Near the lower part of these hoppers are rotary agitators 4 and 5 to insure the downward movement of the sand and cement into the measuring-cylinders.

6 is a shaft on which the sand-measuring cylinder is mounted; 7, a shaft on which the cement-measuring cylinder is mounted, each being located below the respective hoppers 2 and 3. At the respective ends of these cylinders are heads 8, between which are radial partitions dividing each cylinder into a number of separate compartments or segmental chambers, four being shown in this construction. To change the capacity of these chambers in the cylinders, plates 11 are provided of various widths, as indicated by dotted lines, which when placed in the chambers will variously reduce the capacity of the same. These plates are secured in place by pins 31 and a spring-catch 30 on each plate, which engage openings 10 in the heads 8, and thus securely hold the plates in place. These measuring-cylinders rotate between segmental concaves 12, located at each side thereof and adapted to close the side chambers of the cylinders, the upper chamber of each being open to its respective hopper and the lower chamber of each opening downward to discharge its contents into the mixer.

To avoid stalling the device in the event of there being gravel in the sand, a pivoted gate 13 is provided in the wall of the hopper adjacent to the cylinder on the side toward which the cylinder turns, which gate is yieldingly held closed by a spring 14. The vertical wall of the case will crowd the gravel into the chamber, and thus prevent clogging of the cylinder by the gravel. This spring 14 is of such strength as to hold the gate 13 closed against the normal pressure of the contents of the hopper 2 and will only yield to let any gravel pass that may be caught between the gate and the edge of the partition 9.

15 represents a water-tank, to which is connected a pipe 16 to convey water to the mixer, which water is distributed by means of a suitable perforated pipe 17 on the end of the pipe 16.

The mixing device consists of two parallel shafts 18, on which are mounted in alternate relation short screw conveyers 19 and flat radial paddles 20, the conveyers on one shaft being opposite the paddles on the other. The bottom of the conveyer-trough forms a ridge 21 between the two mixers. In the pipe 16 is a plug-valve 22, operated by means of a disk 23, attached to the valve, and provided with segmental slots concentric with its axis, through which slots extend bolts 25 to adjustably secure a lever 24 to the disk, whereby the valve is periodically opened and closed. A spring 38, attached to this lever, closes the valve, and pins 29 in the sprocket-wheel 26 periodically raise the lever to open the valve. By adjusting the lever on the disk the valve may be adjusted to open more or less. To operate these various devices, the agitator-shaft 4 constitutes a driving-shaft and is rotated by any convenient means. On this driving-shaft is a sprocket-wheel 35, connected by a chain 38 to a sprocket-wheel 37 on one of the shafts 18. The mixer-shafts 18 are connected by a pair of spur-gears 32. The mixer-shafts are thus constantly rotated in opposite directions. On the shaft 4 is also a sprocket-wheel 33, connected by a chain 39 to a sprocket-wheel 36, journaled on the shaft 6 and freely rotative thereon. This chain 39 also engages a sprocket-wheel 34 on the agitator-shaft 5 in the cement-hopper. To impart an intermittent rotary motion to the chambered cylinders and to turn the same through ninety degrees at each revolution of the wheel 36, said wheel is provided with a pivoted arm 42, extending radially from its hub and held yieldingly toward a disk 40, fixed on the shaft 6, on which the sand-measuring cylinder is mounted. Projecting from the face of this disk are four equidistant studs or pins 41, which are successively engaged by the arm 42. To disengage the arm after the cylinder has been rotated a proper distance, a face-cam 43 partially surrounds the disk 40 and is omitted throughout about ninety degrees of the circuit. This cam is traversed by the arm 42, which thus forces the arm away from the disk 40 and releases it from engagement with one of the pins 41 and carries over the next two pins and permits it to engage the third pin and again move the cylinder. To simultaneously rotate the cement-cylinder and the sand-cylinder, the shafts 6 and 7 are connected by means of the sprocket-wheels 26 and 27, fixed on the respective shafts at the ends opposite to the ends shown in Fig. 1, and the chain 28, engaging said wheels.

In operation the agitators and the mixer have a constant rotary motion. The paddles 20 of the mixer carry the material over the ridge 21 at frequent intervals and the conveyers carry it forward, whereby the stock is thoroughly mixed. The measuring-cylinders move intermittently the width of one of the chambers at each revolution of the wheel 36, and during this movement the valve 22 is opened more or less, according to the adjustment of the lever on the disk, whereby a regulated quantity of water is discharged into the mixer.

By changing the plates in the sand-cylinder the quantity of sand delivered to the mixer may be varied, and, if desirable, like plates may be used in the cement-cylinder, also to vary the amount of cement delivered. I thus provide automatic means for apportioning the ingredients and for thoroughly mixing the same. When once properly adjusted, the mixture will be uniformly proportioned without other attention than to keep the device supplied with sand, cement, and water, the latter being supplied to the tank preferably through the usual form of float-valve to maintain uniform "head" or pressure on the valve.

Having thus fully described my invention, what I claim, and desire to secure by Letters Patent, is—

1. The combination of two hoppers, rotary agitators in the hoppers, chambered cylinders beneath the hoppers, concaves at the opposite sides of the cylinders, a mixer below the cylinders, means for supplying water to the mixer, means for rotating the agitators and the cylinders, and means for operating the mixer.

2. In a cement-mixer, the combination of a hopper, a cylinder having heads provided with openings and also having radial partitions, concaves at opposite sides of the cylinder, detachable plates in the cylinder, and lugs and a spring-catch on the plates to engage the openings in the heads.

3. In a concrete-mixer, a mixing device comprising two parallel shafts, radial paddles and short screw conveyers arranged alternately on said shafts, and means for rotating the shafts in opposite directions.

4. In a concrete-mixer, a mixing device comprising a double trough having a ridge therebetween, a shaft in the axis of each trough, radial paddles and short screw conveyers arranged alternately on each shaft and alternately opposite on the respective shafts, and means for rotating the shafts in opposite directions.

5. In a concrete-mixer, a hopper, a chambered cylinder, a shaft on which the cylinder is mounted, concaves at each side of the cylinder, a disk fixed on the shaft, pins in the disk, a wheel journaled on the shaft, a radial arm pivoted on the wheel, and a cam partially surrounding the disk and engaging the arm to move it out of contact with the pins in the disk.

6. In a concrete-mixer, a hopper, a yielding gate in the lower edge of one side of the hopper, a spring engaging the gate a cylinder having heads and radial partitions, a vertical wall, a concave at one side of the cylinder and below the gate, a concave at the opposite side of the cylinder, and means for rotating the cylinder.

7. In a concrete-mixer, a hopper for sand, a hopper for cement, a water-tank, a shaft below each hopper, a chambered cylinder on each shaft, means for imparting a simultaneous intermittent movement to said shafts and cylinders, a mixer below the cylinders, means for operating the mixer, a pipe extending from the tank to the mixer, a valve in the pipe, a lever adjustably attached to the valve, a spring attached to the lever, a wheel on one of the shafts, and pins in the wheel to engage and move the lever.

8. The combination of a mixer, means for supplying sand and cement to the mixer, a water-tank, a pipe extending from the tank to the mixer, a plug-valve in the pipe, a disk attached to the valve and having segmental slots, a lever attached to the disk by bolts adjustable in the slots, a spring connected to the lever to close the valve, a rotative wheel, and pins in the wheel to engage the lever and periodically open the valve.

9. The combination of a hopper for sand, a hopper for cement, a tank for water, a shaft beneath each hopper and connected by sprocket-wheels and chain to rotate simultaneously, a cylinder on each shaft, each cylinder having two heads and four equidistant radial partitions, concaves at each side of each cylinder, an agitator in each hopper, a mixer comprising a double trough below said cylinders, parallel shafts in the axis of said troughs, paddles and screw conveyers on said shafts, a pipe extending from the tank to the mixer, a valve in the pipe, means for constantly rotating the agitators and the mixer, and means for simultaneously and intermittently rotating the cylinders and opening the valve, In testimony whereof I affix my signature in presence of two witnesses.

GEORGE D. SCHEIFFLER.

Witnesses:
LUTHER V. MOULTON,
EDWARD R. MONROE.